(12) United States Patent
Fiala

(10) Patent No.: US 9,193,463 B2
(45) Date of Patent: Nov. 24, 2015

(54) LAVATORY POTABLE WATER SYSTEM

(71) Applicant: Heath Tecna Inc., Bellingham, WA (US)

(72) Inventor: Peter Edward Fiala, Redmond, WA (US)

(73) Assignee: Heath Tecna Inc., Bellingham, WA (US)

( * ) Notice: Subject to any disclaimer, the term of this patent is extended or adjusted under 35 U.S.C. 154(b) by 72 days.

(21) Appl. No.: 14/120,349

(22) Filed: May 14, 2014

(65) Prior Publication Data

US 2014/0338766 A1    Nov. 20, 2014

Related U.S. Application Data

(60) Provisional application No. 61/822,984, filed on May 14, 2013.

(51) Int. Cl.
   *B64D 11/02*    (2006.01)
(52) U.S. Cl.
   CPC ............ *B64D 11/02* (2013.01); *Y02T 50/46* (2013.01); *Y10T 137/6906* (2015.04); *Y10T 137/86485* (2015.04)
(58) Field of Classification Search
   CPC ..................................................... F64D 11/02
   See application file for complete search history.

(56) References Cited

U.S. PATENT DOCUMENTS

| | | | | |
|---|---|---|---|---|
| 2,336,096 A | * | 12/1943 | Heintz | G01C 19/00 137/625.61 |
| 5,232,010 A | * | 8/1993 | Rozenblatt | B64D 11/02 137/347 |
| 5,303,739 A | | 4/1994 | Ellgoth et al. | |
| 5,622,207 A | | 4/1997 | Frank | |
| 5,769,124 A | | 6/1998 | Ehrhardt | |
| 5,956,780 A | * | 9/1999 | Tyler | B61D 35/007 4/321 |
| 7,299,511 B2 | * | 11/2007 | Quan | E03C 1/01 4/664 |
| 7,533,426 B2 | * | 5/2009 | Pondelick | B64D 11/02 4/638 |
| 8,074,933 B2 | * | 12/2011 | Mackulin | B64C 1/1453 137/209 |
| 8,185,983 B2 | * | 5/2012 | Wierenga | B60R 15/00 4/664 |
| 8,720,463 B2 | * | 5/2014 | Becker | B64D 11/02 137/1 |

FOREIGN PATENT DOCUMENTS

| | | |
|---|---|---|
| EP | 0298199 A2 | 11/1989 |
| RU | 93049140 | 5/1996 |

* cited by examiner

*Primary Examiner* — John Fox
(74) *Attorney, Agent, or Firm* — Dwayne E. Rogge; Schacht Law Office, Inc.

(57) ABSTRACT

To eliminate as many hoses and tubes as possible, reduce overall system size, weight and costs, the manifold system disclosed herein has been developed. The apparatus in some examples utilizes a unitary structure (solid cast) manifold to replace many of the hoses previously provided. Several versions/examples of this apparatus are disclosed herein such as a manifold system and an integrated water manifold wherein a mount for a hot water heater and/or water filter are integrated into the manifold body.

11 Claims, 8 Drawing Sheets

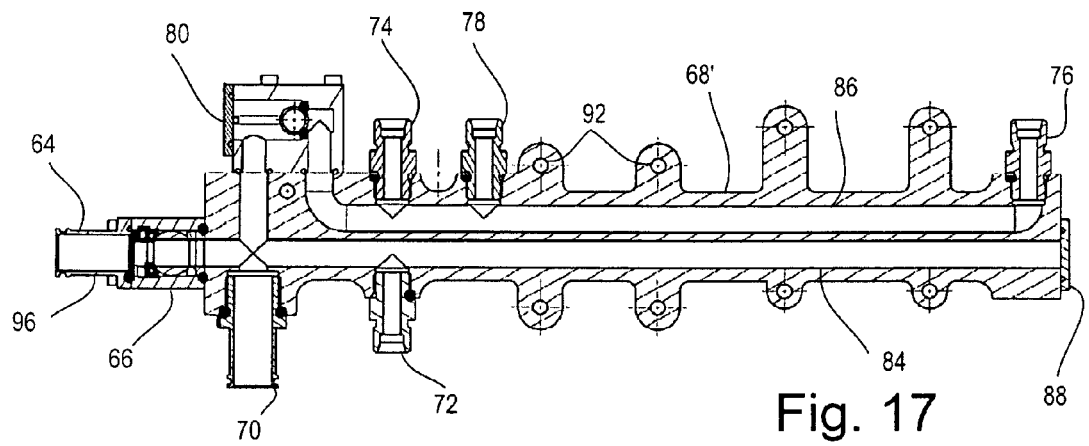
Fig. 17
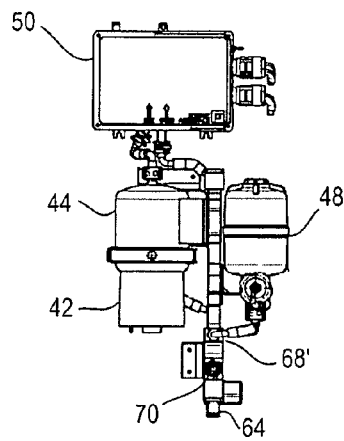
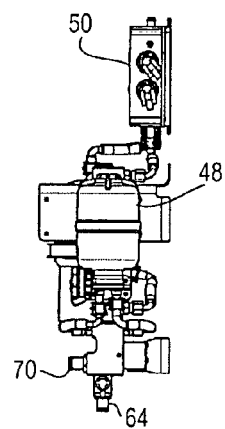
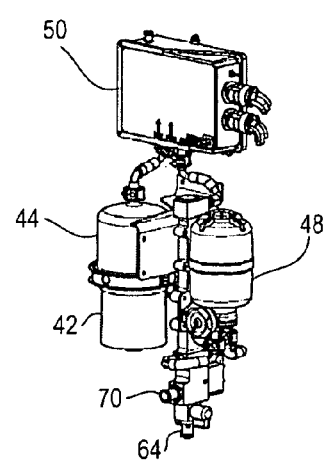
Fig. 14        Fig. 15        Fig. 16

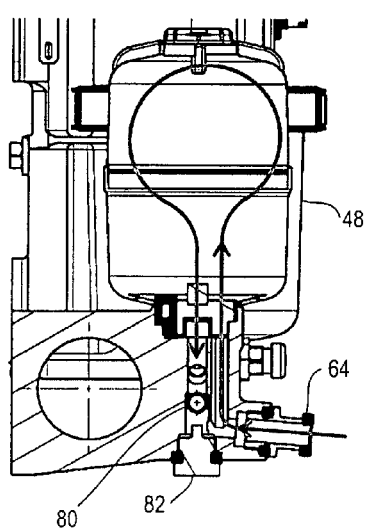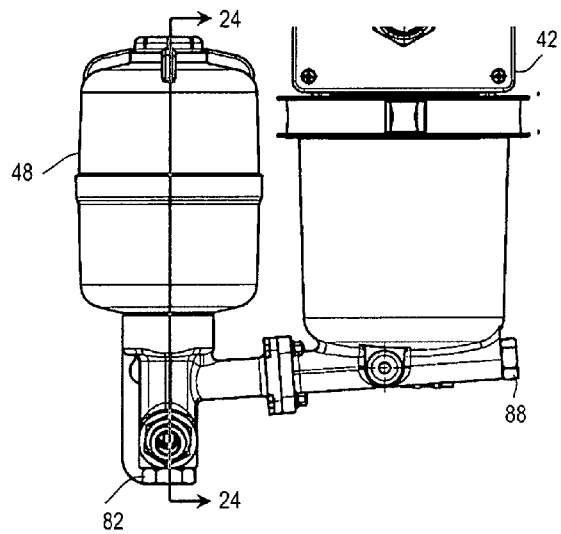
Fig. 24    Fig. 23
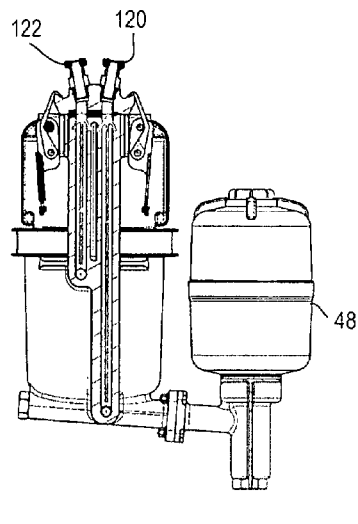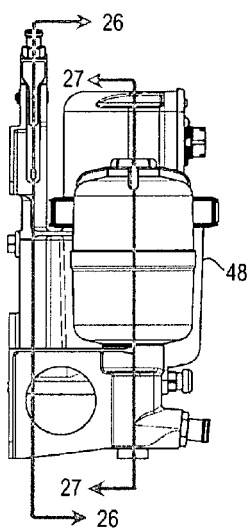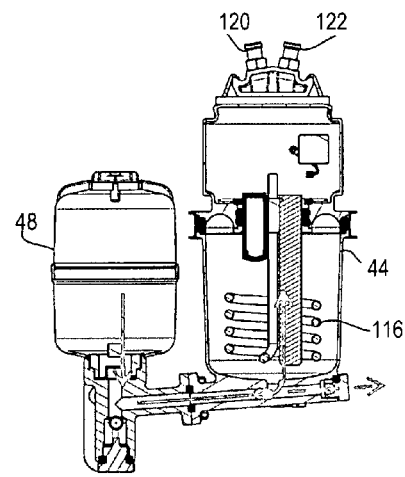
Fig. 26    Fig. 25    Fig. 27

LAVATORY POTABLE WATER SYSTEM

RELATED APPLICATIONS

This application claims priority benefit of U.S. Provisional Patent Application Ser. No. 61/822,984, filed May 14, 2013, incorporated herein by reference.

BACKGROUND OF THE DISCLOSURE

Field of the Disclosure

This disclosure relates to the field of aircraft potable (fresh) water distribution systems. The apparatus and methods find particular use in aircraft lavatories.

BRIEF SUMMARY OF THE DISCLOSURE

Disclosed herein is an aircraft lavatory potable water system comprising in one example: a unitary structure manifold body. The manifold body having: a plurality of independent internal fluid conduits comprising a first fluid conduit and a second fluid conduit, a potable water inlet in fluid communication with the first fluid conduit, a water filter outlet in fluid communication with the first fluid conduit, a water filter inlet in fluid communication with the second fluid conduit, a water heater outlet in fluid communication with the second fluid conduit, a cold water outlet in fluid communication with the second fluid conduit; and a check valve mounted to the manifold body to allow one-way water flow from the second conduit to the first conduit during a purge of the system.

The manifold as recited may further comprise: a shutoff valve in fluid communication between the potable water inlet and the first conduit.

The manifold as recited above may be arranged wherein the shutoff valve is a remotely operated valve. Such a remotely operated valve may be controlled mechanically, pneumatically, or other methods.

The manifold as recited above may be arranged wherein the filter outlet comprises a filter housing mount directly coupled to the manifold body.

The manifold as recited above may further comprise a toilet water flush outlet in fluid communication with the first fluid conduit.

The manifold as recited above may be arranged wherein the manifold body is formed by a process of injection molding.

The manifold as recited above may be arranged wherein the manifold body comprises fastening brackets attaching the manifold body to an aircraft fuselage.

The potable water system may further comprise a water filter housing and a water filter therein in fluid communication between the water filter outlet and water filter inlet.

The manifold may be arranged wherein each of the potable water inlet, water filter, water filter, water heater outlet, and cold water outlet comprises a hose coupling receiver.

The potable water system as recited may further comprise a hose coupling attached to each of the coupling receivers.

The manifold as recited may further comprise a hot water reservoir formed as a unitary structure of the manifold body.

BRIEF DESCRIPTION OF THE SEVERAL VIEWS OF THE DRAWINGS

FIG. 14 shows a front view of one example of a lavatory water system wherein the manifold is oriented with the fluid conduits oriented vertically.

FIG. 15 shows a front view of the example shown in FIG. 14.

FIG. 16 shows an isometric view of the example shown in FIG. 14.

FIG. 17 shows a cutaway view of the manifold component shown in FIG. 14.

FIG. 23 is a front view of the apparatus shown in FIG. 18.

FIG. 24 is a cutaway view taken along line 24-24 of FIG. 23.

FIG. 25 is a side view of the apparatus shown in FIG. 18.

FIG. 26 is a cutaway view taken along line 26-26 of FIG. 25.

FIG. 27 is a cutaway view taken along line 27-27 of FIG. 25.

DETAILED DESCRIPTION OF THE DISCLOSURE

As is well known, transport category aircraft are generally provided with one or more lavatories for the use by passengers and crew. Such lavatories are very small as the space on all aircraft is at a premium. Although such lavatories generally require a toilet and sink, it is desired that the space for each of these components and all interconnecting components is as small and easily serviced as possible.

Disclosed herein are several examples of potable lavatory water systems for transport category aircraft, each of which are schematically similar. Generally in prior art assemblies, there is a potable water supply to the laboratory, a shutoff valve, a water filter, a water heater, a check valve, a faucet, and an assorted combination of hoses, tubing, and couplings to connect these components together. These components are typically located under the sink in a cabinet that facilitates access for maintenance.

Figure 12:
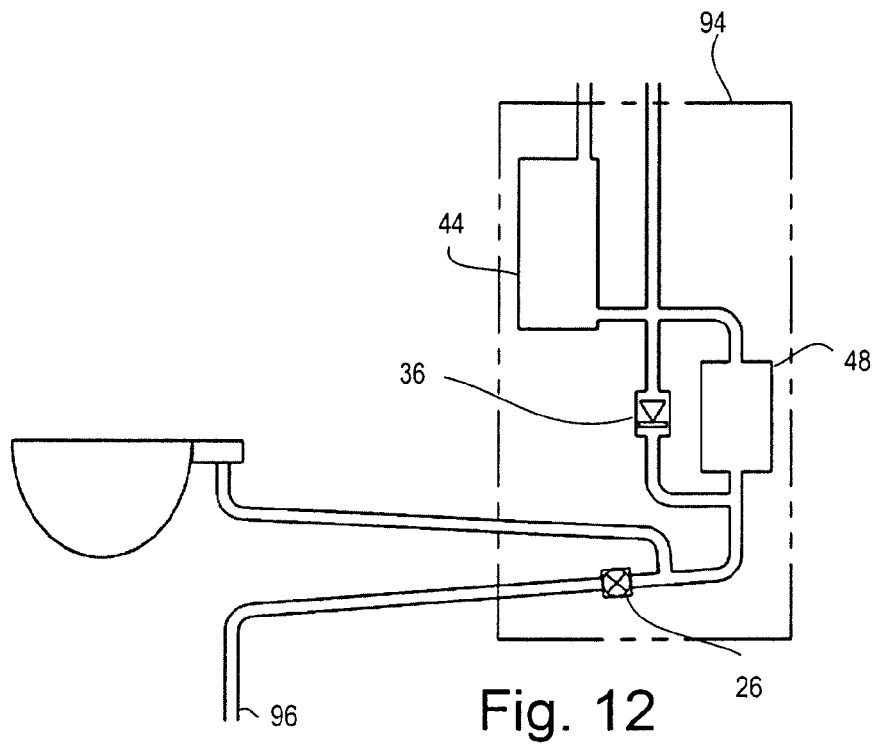
FIG. 12 shows a diagram of a lavatory water system.

The overall potable water system usually also supplies flush water to the toilet assembly for use during flushing. The overall system must also be capable of being drained completely of water for maintenance or cold storage of the aircraft. For ease of use, a gravity drain may be utilized wherein upon opening of a valve, all of the potable water in the distribution system including water in any water filters, water heaters, sink supply line, toilet flush water supply line will drain out of the system. During system draining of such a gravity drain system, the water is drained through the lowest point in the system. Often, a check valve will be provided in the system to protect the water filter by only allowing the water inside of the filter to train through the filter in one direction. All other water in the system bypasses the filter during draining. A schematic of one example of such a system is shown in FIG. 12.

Figure 5:
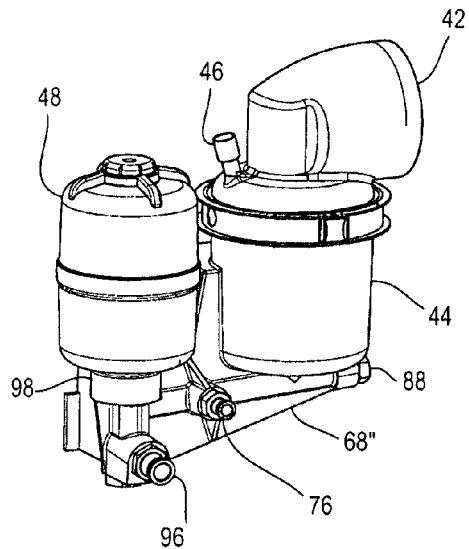
FIG. 5 shows an integrated manifold assembly with a water filter and hot water assembly attached thereto.
Figure 6:
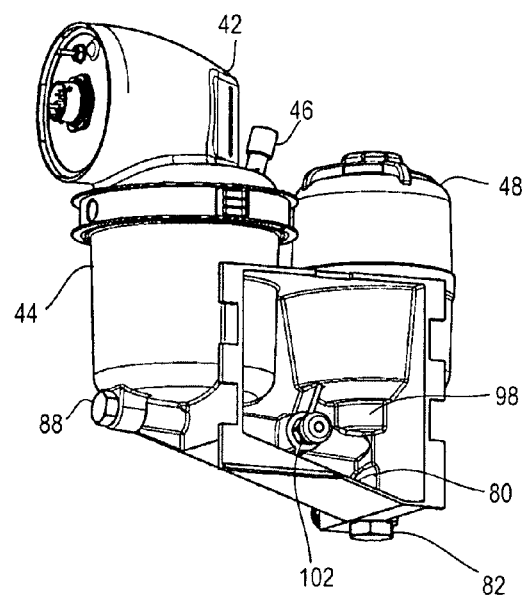
FIG. 6 shows the integrated manifold assembly of FIG. 5 from another angle.

To eliminate as many hoses and tubes as possible, reduce overall system size, weight and costs, the manifold system disclosed herein has been developed. Several versions/examples of this apparatus are disclosed herein such as the manifold system shown in FIG. 3 and the integrated water manifold system shown in FIG. 5 and FIG. 6 wherein a mount for a hot water heater and/or water filter are integrated into the manifold body.

The water manifold system combines the fluidic components into one assembly; shutoff valve, check valve, and many of their associated connecting hoses/tubes.

Figure 1:
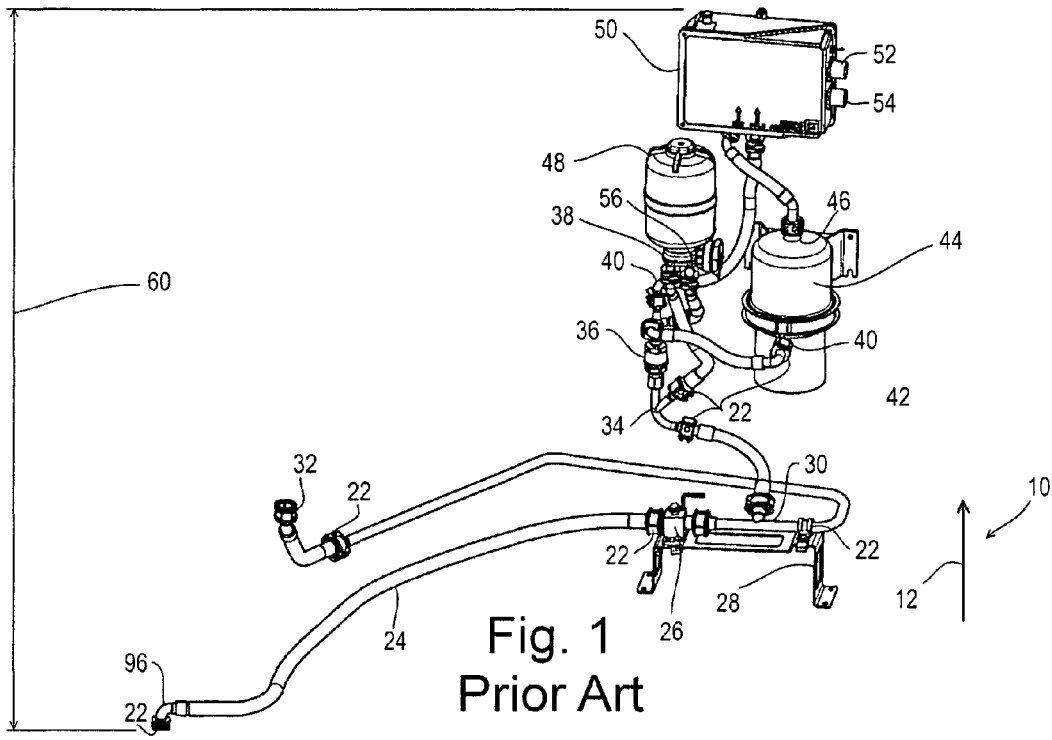
FIG. 1 shows one example of a prior art lavatory water system.

Although the apparatus can be rotated in a horizontal plane and still function, as shown in FIG. 1 an axes system 10 is disclosed including a vertical axis 12 pointed in an upwards direction.

As shown in FIG. 1, a typical prior art system installation uses a large number of hoses, couplings, and interconnecting structure to distribute water from an aircraft potable water supply system to a sink, toilet, drinking fountain, etc. as desired. As previously mentioned, the space allowance for the overall potable water distribution system within an under sink cabinet (94 of FIG. 12) is very constricted. FIG. 1 shows one example of a typical lavatory water system comprising a water supply fitting 96 connected by way of hose (tubing) 24 and another fitting 22 to a shutoff valve 26 which is operated to disconnect the lavatory water system from the aircraft water supply system. One such aircraft fresh water supply system is shown in U.S. Pat. No. 5,303,739 used herein to reduce the length of this disclosure. To further reduce the length of this disclosure, it is assumed that substantially each hose has a fitting 22 at each end thereof. The valve 26 is utilized for example if there is a leak in the lavatory water system to avoid flooding of the aircraft and reduce water waste. The shutoff valve 26 of this example may be mounted by way of bracket 28 to the fuselage or fixed internal structure thereof of the aircraft. A T-fitting 30 is coupled to the other side of the valve 26 with one outlet leading towards a toilet flush coupling 32. The other outlet of the T-fitting 30 in this example leads to a Y-fitting 34. One branch of the Y-fitting 34 diverts flow to a check valve 36 which prohibits flow there through into a water filter mount 38 but allows for water flow from the water filter mount 38 during a purge. The other branch of the Y-fitting 34 leads to the inlet side 40 of the water filter 48. The outlet 56 of the water filter 48 leads to the inlet 40 of a water heater. The water heater in this example comprises a water heater element 42 and a water heater reservoir 44. The outlet 46 of the water heater reservoir 44 of this example leads to an electronic faucet controller-thermostat 50. This thermostat 50 controls the hot water outlet temperature at outlet 52 to the sink or other lavatory component.

The outlet 56 of the water filter 48 also leads directly to the thermostat 50 so as to provide cold water thereto. The thermostat 50 also controls the cold water outlet temperature at outlet 54 to the sink or other lavatory component.

Clearly, in this prior art example, a significant number of interconnecting hoses are required as well as the couplings 22 utilized on the ends thereof.

These hoses and couplings significantly increase the overall vertical dimension 58 of this prior art apparatus.

Figure 2:
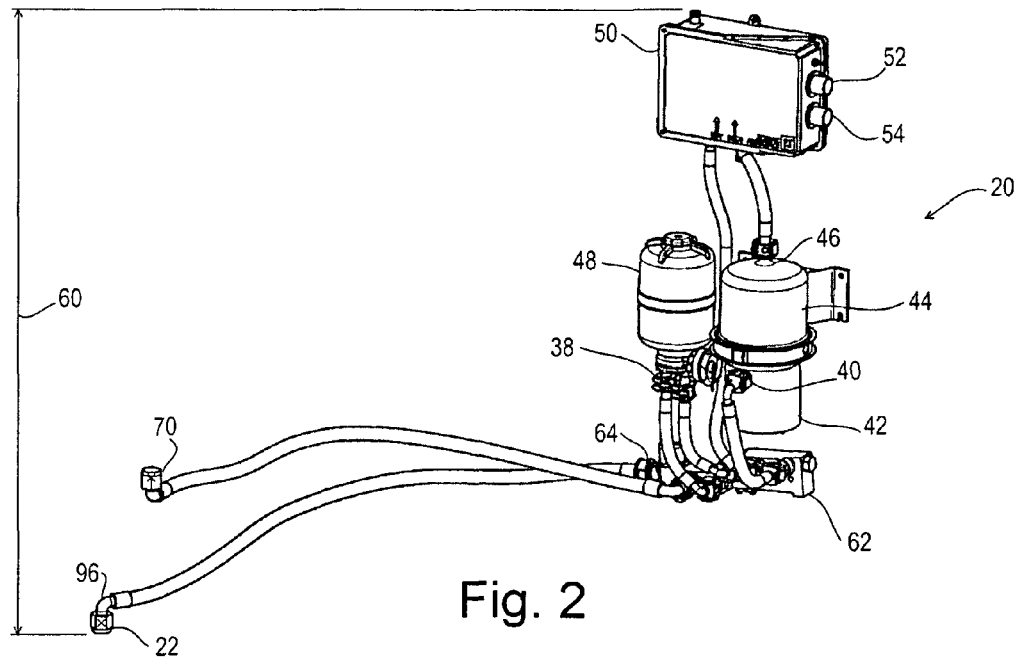
FIG. 2 shows one example of a lavatory water system utilizing a manifold assembly.

Looking to FIG. 2, is shown an improved or next generation water manifold system 20. As can be clearly appreciated by comparing this manifold to the apparatus shown in FIG. 1, the overall vertical dimension 60 of this manifold system 20 is substantially smaller than that of the overall vertical dimension 58 of the apparatus shown in FIG. 1. In this example, a water supply fitting 96 is coupled to the aircraft fresh water supply in the same manner as the previous example. However, the water supply is connected to a water system manifold assembly 62 at an inlet 64. The water system manifold 62 replacing many of the hoses and couplings shown in FIG. 1 to reduce installation costs, saves space, and significantly reduce the overall vertical dimension 60.

Figure 3:
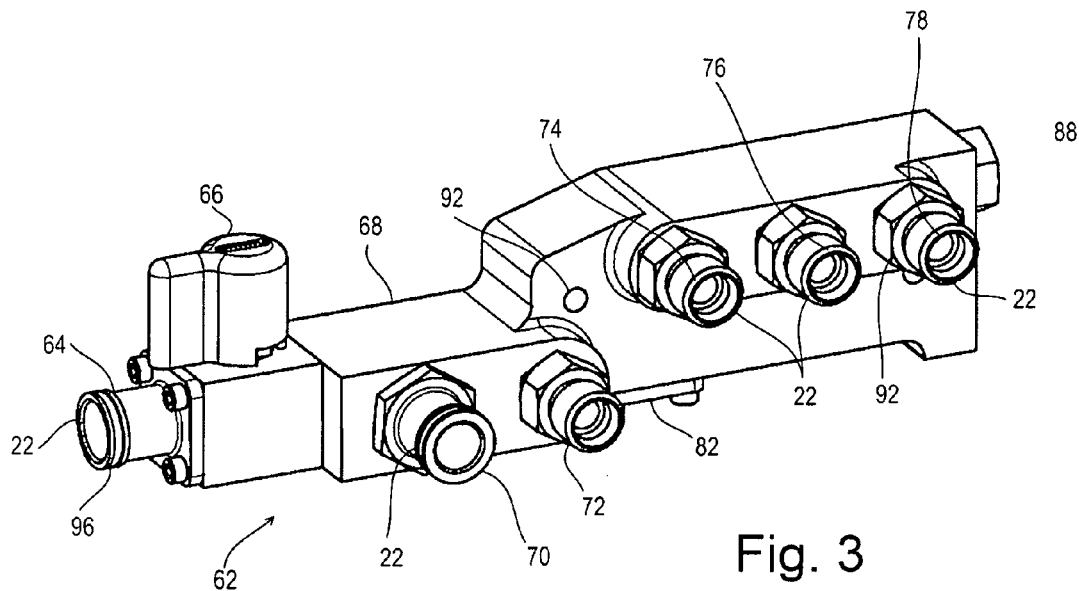
FIG. 3 shows one example of the manifold assembly shown in FIG. 2.

Looking to FIG. 3 is shown this first example of the manifold 62 with a plurality of fittings 22 extending therefrom. In the form shown, a shutoff valve 66 is mounted to the manifold body 68 for selective control (flow) of potable water from the inlet 64 to the outlets attached thereto. These outlets comprising an outlet 70 providing flush water to the toilet, an outlet 72 to the water filter, an inlet 74 from the water filter to a second fluid conduit, and outlet 76 to the thermostat 50, and an outlet 78 to the water heater. In addition, a check valve 80 having a check valve cover 82 is fitted into the manifold body 68 to allow for selective passage of water from the first fluid conduit 84 to the second fluid conduit 86 as can be appreciated by looking to FIG. 4. O-rings 114 may be utilized between the caps and/or couplings to enhance water retention. In one form, the couplings such as couplings 22 and others may be formed as a unitary structure with the manifold body.

In addition to the couplings 22 which may be flareless connections, fixed cavity connections, or other couplings, an auxiliary water outlet 88 may be provided. This water outlet 88 as shown may be used in future applications such as for example a drinking fountain and will also ease in manufacturing of the manifold body as it is aligned with the longitudinal axis of the second fluid conduit 86. In one form, as shown, the auxiliary water outlet 88 may be closed by way of a removable plug 90 threaded into the coupling receiver. To utilize this outlet, the plug 90 is removed and a coupling 22 may be attached thereto such as by way of male threads on the coupling fitting into female threads in the outlet 88. This is one example of how each of the couplings 22 may be attached to the manifold body 68.

Figure 4:
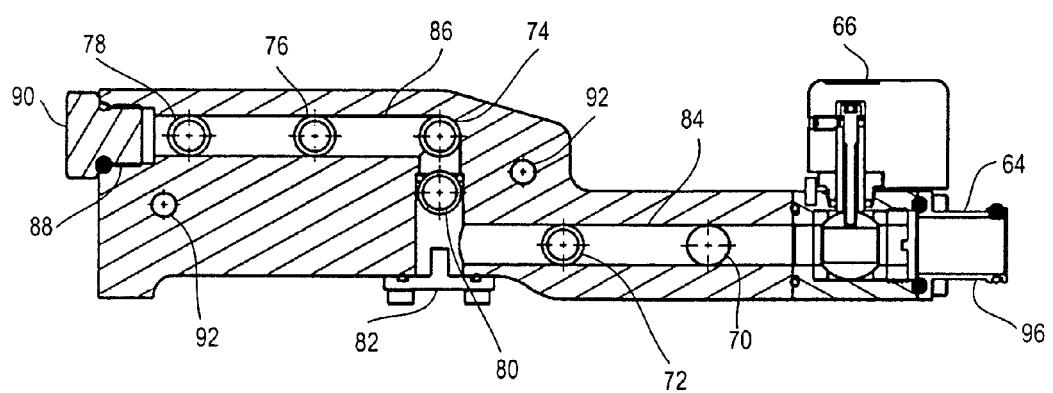
FIG. 4 shows a cross sectional view of the manifold assembly shown in FIG. 4.

Looking to FIG. 4, it can be seen how the potable water inlet 64 is in fluid communication with the first fluid conduit 84 when the shutoff valve 66 is in the open position. The check valve 80 prohibits flow directly from the first fluid conduit 84 to the second fluid conduit 86 such that the inflow water must either exit through outlet 70 to the toilet or through outlet 72 to the water filter. When however the system is purged, such as by removing the hose or tubing from the inlet fitting, water is allowed to flow past the check valve 80 and out through the inlet 64. This allows for water with in the water filter 48 to drain without causing a back flow through the water filter 48 which is not desired.

To facilitate installation, surfaces defining fastener pass-through voids may provide mounting holes 92 through which fasteners may be attached to removably fasten the manifold assembly 62 to the fuselage of the aircraft such as interior structure of the sink cabinet 94.

In FIG. 14-17 a second example of the manifold body 68' is shown with similar functionality. This example utilizes a fully external check valve 80 which may also be utilized in the other examples. In this example the auxiliary water outlet 88 is in fluid communication with the first fluid conduit 84 downstream of the filter. This should be taken into consideration if attached to a drinking fountain for example.

The manifold body 68 may be formed in several different methods, either machined or molded or combinations thereof. It may also be produced from plastics, metals, or other materials. Four different installations, different sizes and configurations of ports (flared, flare less, fixed cavity, etc.) may be utilized. In addition, the manifold body 68 may be utilized without the shutoff valve 66 attached thereto. In addition, the manifold body 68 is scalable so as to be manufactured with additional ports or different sized ports. For example, looking to the example of FIG. 17 it can be appreciated that there are additional locations wherein ports may be attached to the first fluid conduit 84 or the second fluid conduit 86 quite easily.

The disclosed water manifold is also designed to accommodate additional shutoff valve on the opposing and such as at the auxiliary water outlet 88. This provision permits use in lavatories that have separate water inlets and drain lines to and from the lavatory. For example, the Boeing 777 aircraft and the forward lavatories in the Boeing 737 aircraft have separate water inlets and drain lines to and from the lavatory. In these examples, the water inlet to the lavatory is typically above the lavatory and the drain is the lowest point. In these examples, one valve is the shutoff valve and the other is a drain valve.

Figure 7:
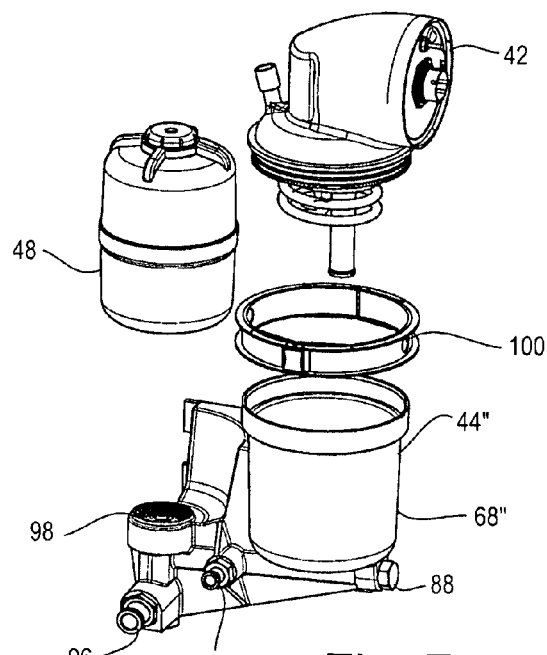
FIG. 7 shows the integrated manifold assembly of FIG. 5 partially disassembled.
Figure 9:
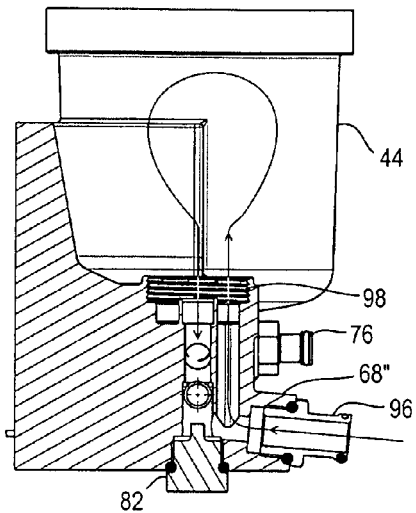
FIG. 9 shows a cross-sectional view taken along line 9-9 of FIG. 8 including a water flow path through the assembly.
Figure 8:
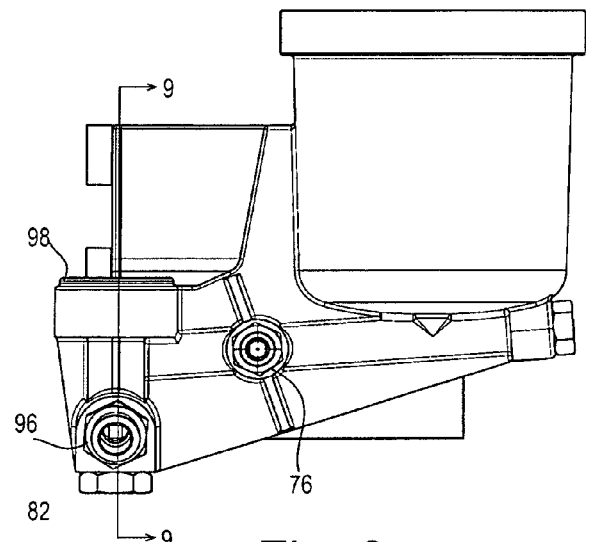
FIG. 8 shows a side view of the assembly of FIG. 5.
Figure 10:
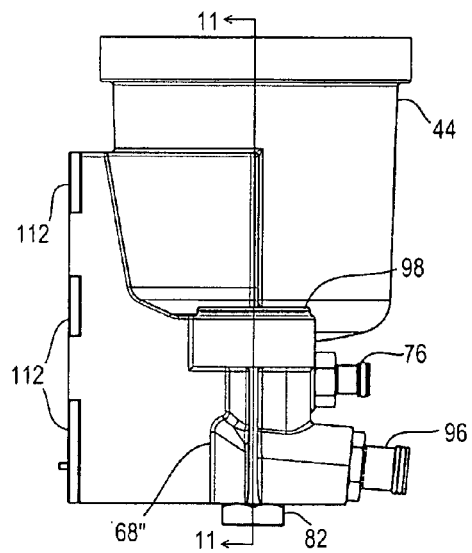
FIG. 10 shows an end view of the assembly of FIG. 5.

One example of the water manifold shown in FIG. 3 over the integrated water manifold shown in FIG. 7 is that the non-integrated water manifold may be easily configured to interface with multiple suppliers water heaters, water filters, and faucet controllers.

Figure 13:
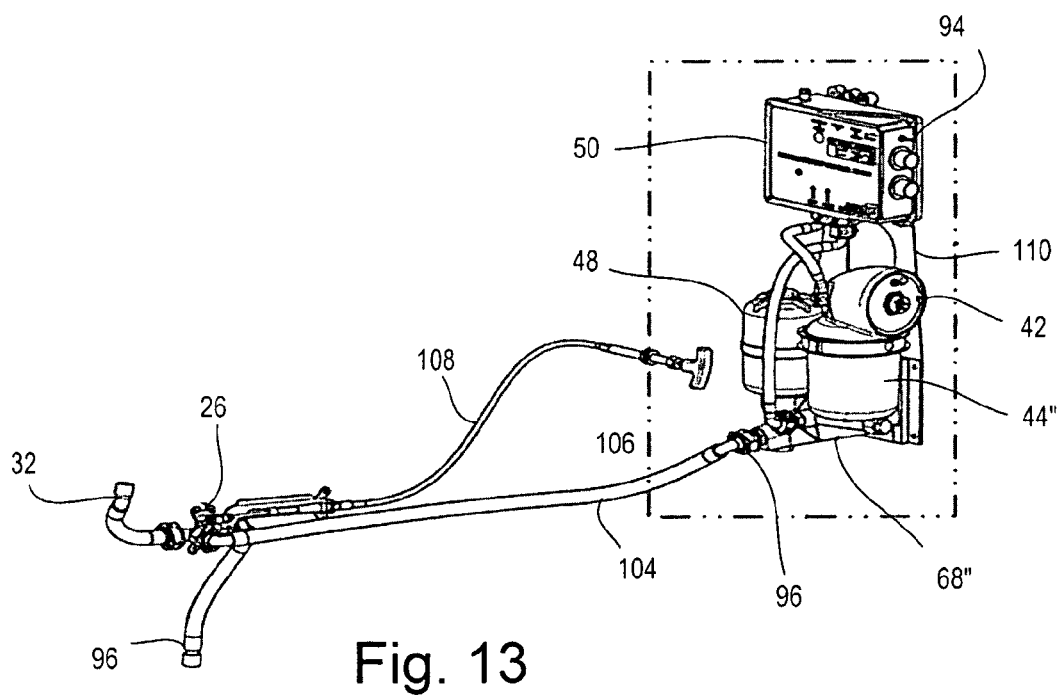
FIG. 13 shows one example of a lavatory water system utilizing a manifold assembly.

The integrated water manifold system shown for example in FIG. 13 utilizes the same fluid components as shown in the non-integrated manifold and further incorporates a mount for a hot water reservoir 44' and/or a mount for a water filter 48 into the manifold body 68". In the example shown in FIG. 7, the hot water reservoir 44" is formed (cast/molded) as part of the manifold body 68". A clamp 100 may be utilized to couple the heater element 42 to the hot water reservoir 44" in any of the examples.

In addition, a filter mount 98 is attached directly to or formed (cast/molded) with the manifold body 68". This example of the manifold body eliminates the need to separately mount and connect those components. A pressure relief valve 102 may also be provided. A check valve 80 having a check valve cap 82 may be utilized as previously disclosed.

In the example shown in FIG. 13 the shutoff valve 26 is vertically below and remote from the water inlet 96, separated therefrom by a hose or tubing 104.

Figure 11:
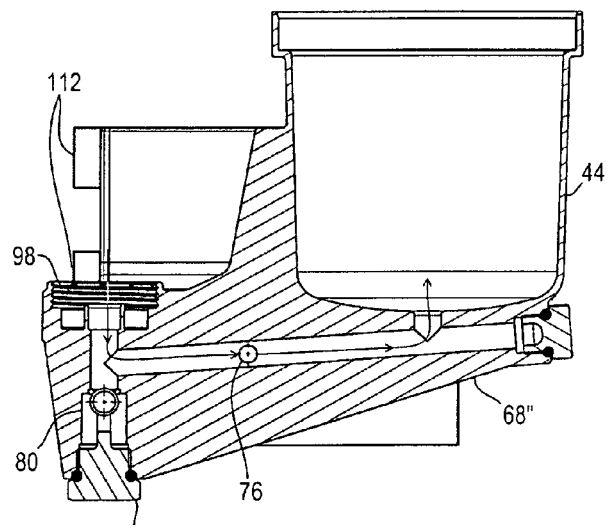
FIG. 11 shows a cross-sectional view taken along line 11-11 of FIG. 10.

In this example, the shutoff valve is manipulated by a handle 106 separated from the valve 26 via cable 108 which allows remote actuation of the valve 26. Electronic solenoid valves or other mechanical or electrically operated valves may be utilized. As shown, the shutoff valve has been removed from direct attachment to the manifold in favor of using a remote shutoff valve to minimize hose run lengths, provide flexibility in manifold location, and optimization of shutoff valve location. Looking still to FIG. 13, it can be seen how the manifold body 68" is removably mounted to a mounting base 110 which is affixed to the aircraft such as to the interior of the sink cabinet 94. In one example, the manifold body 68" is attached to the mounting base 110 by a quick release system which is designed to be able to be removed from the mounting base 110 without the use of tools. Looking to FIG. 11, one example of the mounting system utilizes a plurality of tabs 112 which engage tab receivers on the mounting base 110 shown in FIG. 13.

Figure 18:
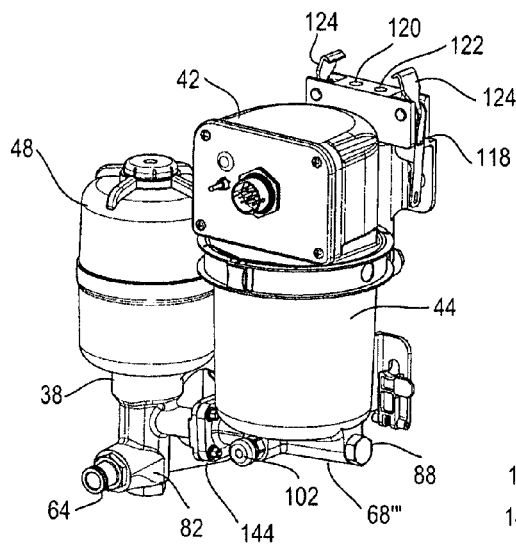
FIG. 18 shows a front isometric view of another example with several modifications to the example shown above.

Looking to FIG. 18 is shown another example wherein functionally similar components use the same numbering system is that shown in the previous examples. For example, the water filter is shown as 48, the water filter mount is shown as 38. In this example, there are several modifications from that shown in the previous examples.

In the example shown in FIG. 18 the heating element 42 may incorporate an outlet module 118. This significantly reduces the overall size of the apparatus. In the cutaway view of FIG. 27 it can be seen how the heating element 42 has a heating coil 116 attached thereto and fitted with in the hot water reservoir 44.

In addition, an outlet module 118 is shown in fluid communication with the hot water reservoir 44. The outlet module 118 has a plurality of ports 120 and 122 through which cold water may flow through the port 120 and hot water may flow through the port 122 as can be appreciated by looking to FIGS. 26 and 27 where it is clear that both the hot water and the cold water flow through the water filter 48 however the cold water conduits bypass the heating coil 116. Looking back to FIG. 18 it can be appreciated that the outlet module 118 may comprise a plurality of release clips 124 which allow for attachment of several modules. Looking to FIG. 19, a manual faucet interface module 126 is shown comprising a plurality of outlets 128 and 130 which attached to the ports 122 and 120 respectively to provide a direct hose connection there to. In addition, the manual faucet interface 126 has a plurality of release clip receivers 140 to which the release clips 124 attach.

Figure 19:
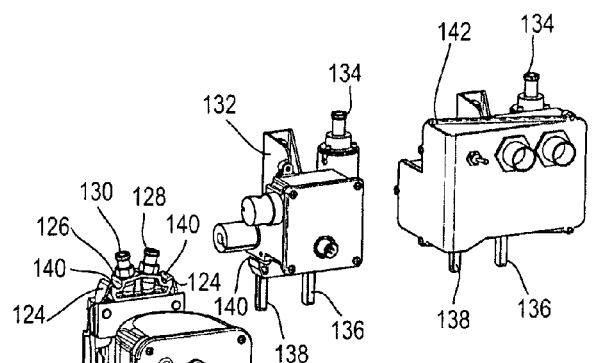
FIG. 19 shows a front isometric view of several components which can be attached to the apparatus shown in FIG. 18.

In FIG. 19 shows an optional preset temperature faucet controller 132 which says a singular outlet 134 which leads to a sink having a single temperature. As shown, the preset temperature faucet controller 132 as a plurality of conduits 136 and 138 which attached to ports 122 and 120 respectively. The preset temperature faucet controller 132 has similar release clip receivers 140 to which the release clips 124 attach. With the manual faucet interface 126, hot water and cold water may be provided to the faucet such that the user can manipulate the faucet to achieve the desired temperature. In the preset temperature faucet controller option 132, the user may only be provided with a flow rate control rather than temperature control.

FIG. 19 shows an adjustable temperature faucet controller module 142. This module functions the same or similar to that of the preset temperature faucet controller 132 and that a singular outlet 134 is provided in fluid communication with conduits 136/138 to provide a controlled temperature water flow to the faucet and a single conduit. In this module however, the temperature of the fluid flow may be controlled remotely.

Looking back to FIG. 19 it can be seen how the water inlet 64 and water filter 48 portions of the manifold 68'" are connected to the water heater components via a coupling 144. This coupling 144 may allow for removal of the water filter components as shown in FIG. 20 wherein the water inlet 64 is formed of a hose attachment removably attached to a portion of the coupling 144.

Figures 20, 21:
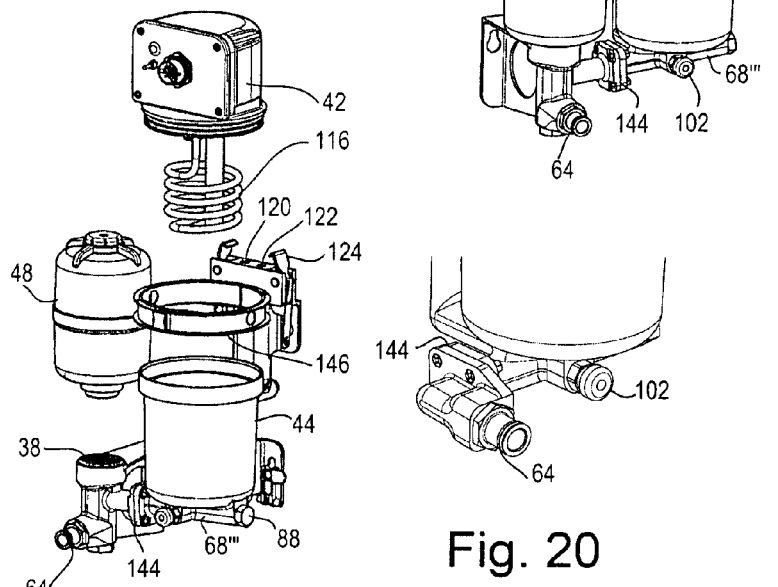
FIG. 20 is an optional modification to the apparatus shown in FIG. 18.
FIG. 21 is a front isometric partially exploded view of the apparatus shown in FIG. 18.

In FIG. 21, it can be seen how the water filter 48 is removably attached to the filter mount 38 by mail threads provided on the lower end of the filter 48 screwing into female threads on the filter mount 38.

In FIG. 201A can also be seen how the heater element 42 attaches to the hot water reservoir 44 in this example by way of a clamp 146. In one form, as previously discussed, the hot water reservoir 44 is a unitary body with the manifold body 68′″. This may be accomplished by way of casting, machining or injection molding.

In FIG. 24, a flow path from the water inlet 64 through the water filter 48 past the check valve 80 is shown.

Figure 22:
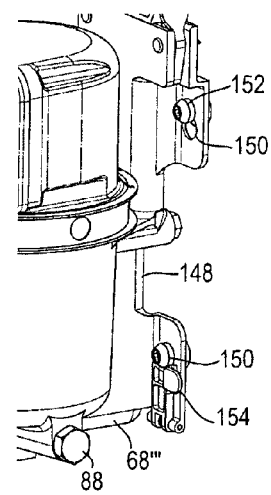
FIG. 22 is an isometric view of the rear portion of the apparatus shown in FIG. 18.

Looking to FIG. 22, another attachment and mechanism is shown wherein a back plate 148 comprises a plurality of keyhole this 150 through which studs 152 pass through a larger portion thereof wherein the back plate is repositioned such that the studs engage a smaller portion of the keyhole 150 thus holding the apparatus in place. The studs 152 mounted directly to the lavatory structure such as the interior compartment of the sink. Looking to the bottom region of FIG. 22, a spring loaded latch 154 may be utilized to prohibit the manifold 68′″ from repositioning in such a way that the back plate comes detached from the studs 152. This mounting assembly can be used with the previous examples as well.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. An Aircraft Lavatory Potable Water System comprising:
   a. a unitary structure manifold body having;
      i. a plurality of independent internal fluid conduits comprising a first fluid conduit and a second fluid conduit,
      ii. a potable water inlet in fluid communication with the first fluid conduit,
      iii. a water filter outlet in fluid communication with the first fluid conduit,
      iv. a water filter inlet in fluid communication with the second fluid conduit,
      v. a water heater outlet in fluid communication with the second fluid conduit,
      vi. a cold water outlet in fluid communication with the second fluid conduit; and
   b. a check valve mounted to the manifold body to allow one-way water flow from the second conduit to the first conduit during a purge of the system.

2. The manifold as recited in claim 1 further comprising: a shutoff valve in fluid communication between the potable water inlet and the first conduit.

3. The manifold as recited in claim 2 wherein the shutoff valve is a remotely operated valve.

4. The manifold as recited in claim 1 wherein the filter outlet comprises a filter housing mount directly coupled to the manifold body.

5. The manifold as recited in claim 1 further comprising: a toilet water flush outlet in fluid communication with the first fluid conduit.

6. The manifold as recited in claim 1 wherein the manifold body is formed by a process of injection molding.

7. The manifold as recited in claim 1 wherein the manifold body comprises fastening brackets attaching the manifold body to an aircraft fuselage.

8. The potable water system as recited in claim 1 further comprising: a water filter housing and a water filter therein in fluid communication between the water filter outlet and water filter inlet.

9. The manifold as recited in claim 1 wherein each of the a potable water inlet, water filter, water filter, water heater outlet, and cold water outlet comprises a hose coupling receiver.

10. The potable water system as recited in claim 9 further comprising: a hose coupling attached to each of the coupling receivers.

11. The manifold as recited in claim 1 further comprising a hot water reservoir formed as a unitary structure of the manifold body.

\* \* \* \* \*